F. O. BOSWELL.
VEHICLE SUSPENSION AND SHOCK ABSORBER.
APPLICATION FILED MAY 23, 1916.

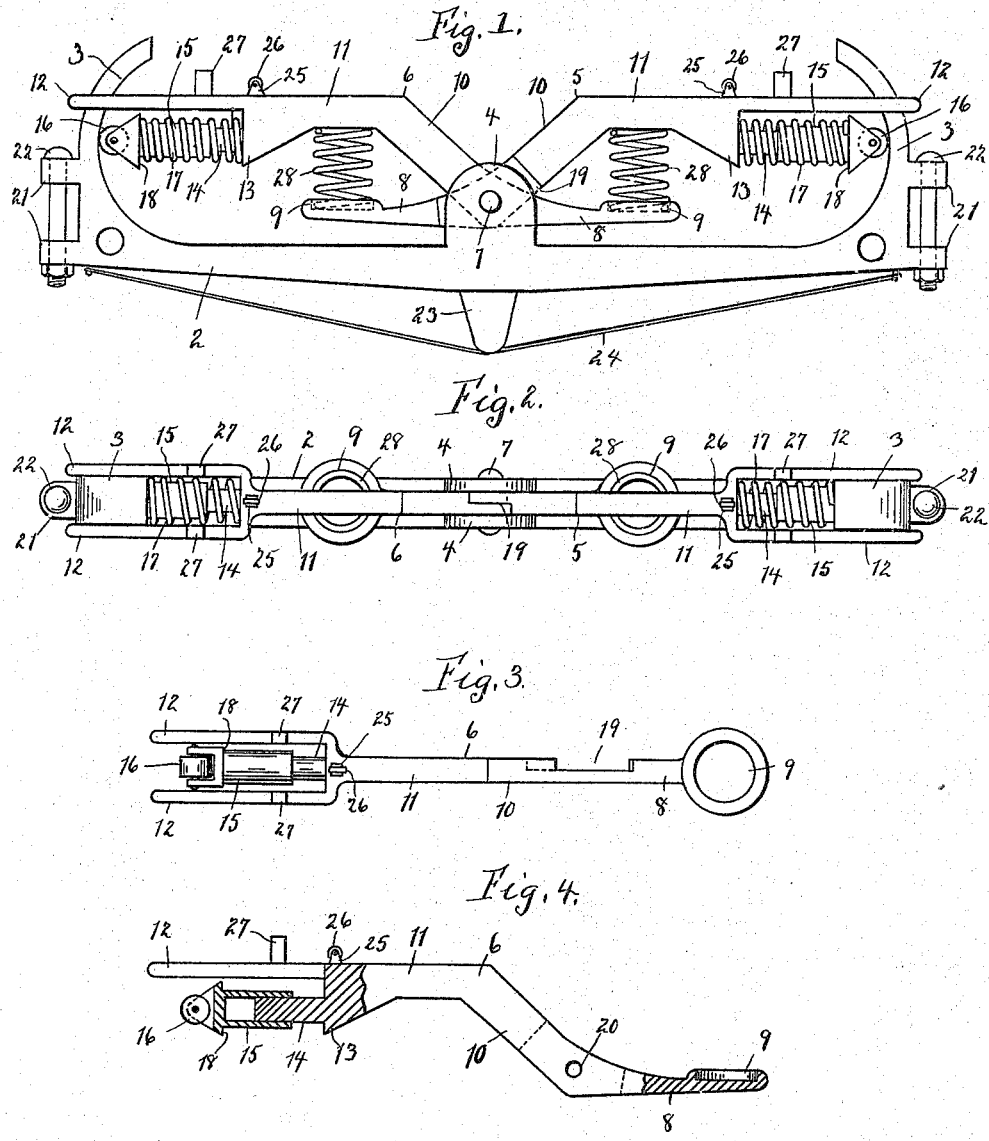

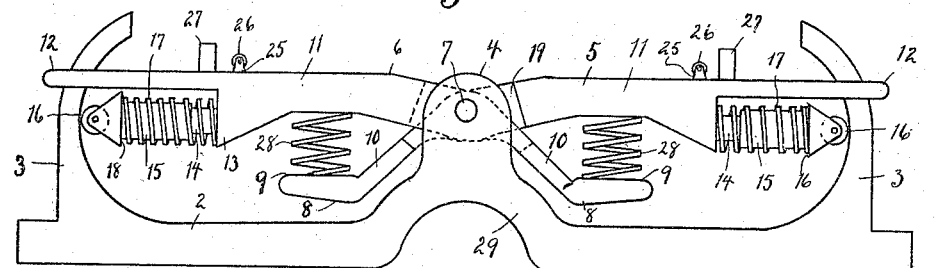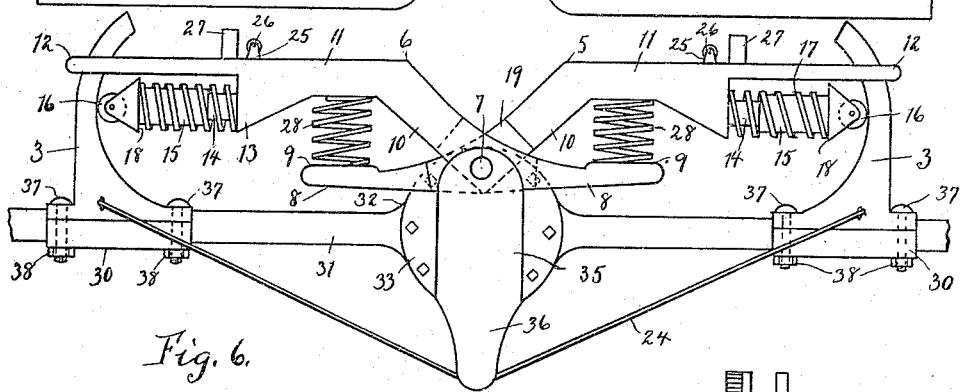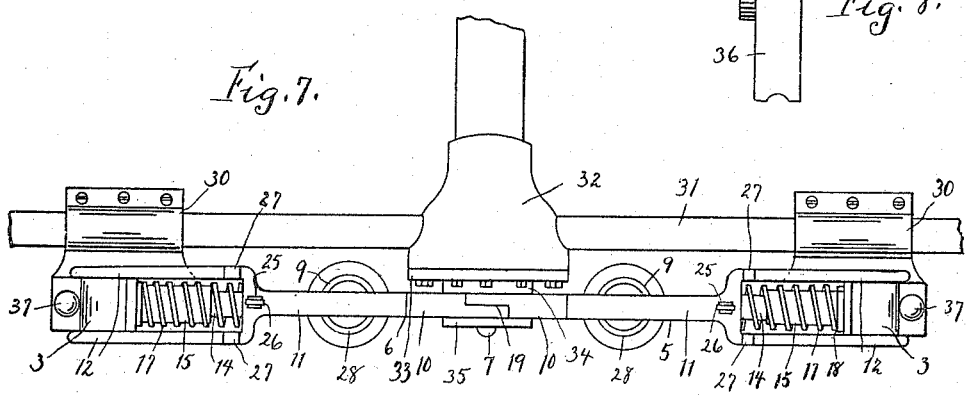

1,228,644.

Patented June 5, 1917.
4 SHEETS—SHEET 3.

Witness
P. N. Brooks

F. O. Boswell
Inventor

By   Attorney   W. W. Williamson

F. O. BOSWELL.
VEHICLE SUSPENSION AND SHOCK ABSORBER.
APPLICATION FILED MAY 23, 1916.
1,228,644.
Patented June 5, 1917.
4 SHEETS—SHEET 4.
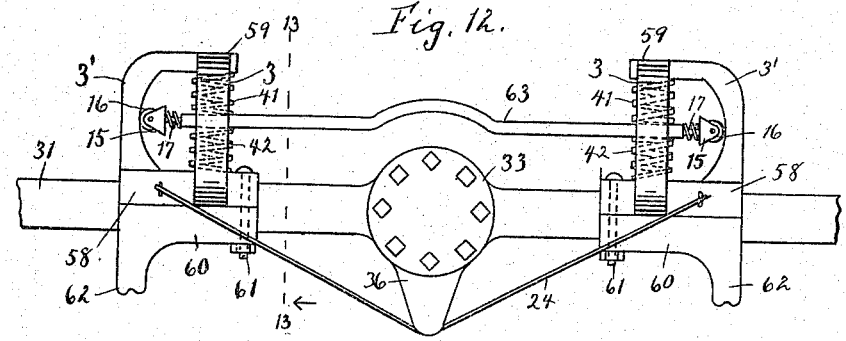
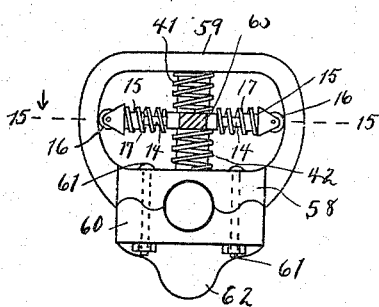
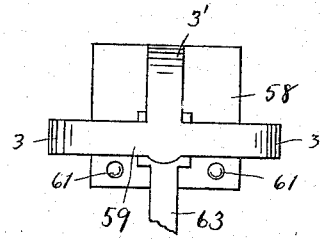
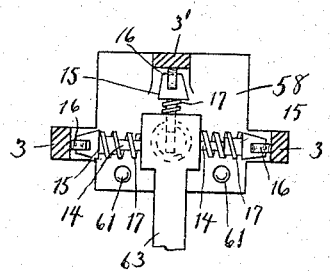
Witness
P. N. Brooks
F. O. Boswell
Inventor
By Attorney W. W. Williamson

UNITED STATES PATENT OFFICE.

FLETCHER O. BOSWELL, OF PHILADELPHIA, PENNSYLVANIA, ASSIGNOR TO F. O. B. MANUFACTURING COMPANY, OF PHILADELPHIA, PENNSYLVANIA, A CORPORATION OF DELAWARE.

VEHICLE SUSPENSION AND SHOCK-ABSORBER.

1,228,644.  Specification of Letters Patent.  Patented June 5, 1917.

Application filed May 23, 1916. Serial No. 99,270.

*To all whom it may concern:*

Be it known that I, FLETCHER O. BOSWELL, a citizen of the United States, residing at Philadelphia, in the county of Philadelphia and State of Pennsylvania, have invented new and useful Improvements in Vehicle Suspensions and Shock-Absorbers, of which the following is a specification.

My invention relates to new and useful improvements in vehicle suspensions and shock absorbers, and has for its object to provide an effective construction whereby the shocks, incident to obstructions upon the roadway, will be absorbed instead of being transmitted to the body of the vehicle and the occupants thereof.

A further object of the invention is to provide a device of the character stated which may be mounted upon the axles of a vehicle, which may be arranged some distance from the axles and connected therewith, which may displace the axles or which may be connected in any suitable manner with the running gear of the vehicle and support the frame or body of the vehicle.

Another object of the invention is to provide a combination of levers and springs for absorbing shocks and evenly distributing the load in the vehicle so that the body swings and is jolted less.

Still another object of the invention is to provide a plurality of spring compression devices engaging arcuate runways or tracks whereby the vertical movement of the vehicle body will be gradually stopped with a cushioning effect.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which—

Figure 1, is a front elevation of one form of my improvement illustrating the same constructed for use as a front axle.

Fig. 2, is a plan view thereof.

Fig. 3, is a similar view of one of the levers, the cushioning or buffer spring being removed.

Fig. 4, is a face view thereof, portions being shown in section to clearly illustrate the construction.

Fig. 5, is a front elevation of another form of my device, showing it adapted for use at the rear of the vehicle.

Fig. 6, is a face view of a slightly modified form of my invention, showing it attached to the rear axle of a vehicle.

Fig. 7, is a plan view thereof.

Fig. 8, is an edge view of the journal lugs formed integral with the cover of the differential gear casing.

Fig. 12, is a face view of a further modified form of my invention, shown mounted on an axle.

Fig. 13, is a section at the line 13—13 of Fig. 12, the axle being removed.

Fig. 14, is a plan view thereof; and

Fig. 15, is a section at the line 15—15 of Fig. 13.

Figure 9:
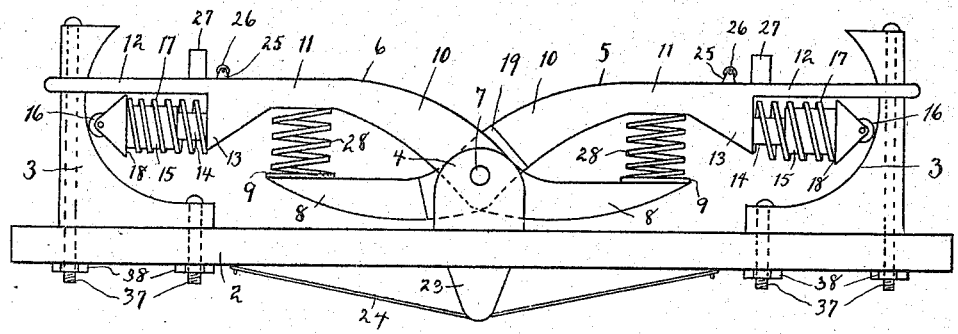
Fig. 9, is a front elevation or face view of another form of my invention.

In carrying out my invention as embodied in Figs. 1 to 4 inclusive, 2 represents a strut beam provided at each end with an arcuate track or runway and having intermediate its length a pair of parallel journal lugs or projections 4, between which are mounted the levers 5 and 6 by means of a stud or shaft 7. The levers 5 and 6 are identical in construction and each comprises a foot 8 having a socket 9 therein, a body 10 inclined upwardly therefrom, an arm 11 projecting from the body in a direction opposite the foot 8, and a pair of parallel fingers 12 projecting from the arm 11, one of which is adapted to project on each side of the arcuate runway or track 3.

The body 11 is provided with an enlargement 13 adjacent the inner ends of the fingers 12, and this enlargement carries a thrust head support 14 on which is slidably mounted the thrust head 15 carrying a wheel or roller 16, adapted to be held in engagement with the arcuate track or runway by means of a spring 17 coiled about the thrust head, one end engaging the shoulder 18 thereof, and the other end engaging the enlargement 13 for normally forcing said thrust head outward.

Each of the levers is provided with a cutout portion or notch 19 in which is mounted the reduced portion of the coacting lever after the manner of a pair of tongs. Each of the levers is also provided in the reduced portion with a hole 20 for the reception of the stud 7. The strut beam at each end is provided with bolt receiving knuckles 21 through which pass the bolts 22 on which are journaled the wheel spindles. Projecting from the lower edge of the strut beam is an extension 23 over which runs the torsion wire 24, the ends thereof being fastened in any suitable manner to the strut beam adjacent the outer ends thereof.

The arms of the levers 5 and 6 carry roller sockets or brackets 25 in which are journaled rollers 26 on which the vehicle body is adapted to operate, said body being attached to said levers in some suitable manner as by stakes 27 projecting upwardly from the levers and registering with openings or grooves in the vehicle body.

In the sockets 9 are mounted one end of each of the springs 28, the other ends of said springs engaging the underside arms of opposite levers, or in other words each of said springs engages the foot of one lever and the arm of the coacting lever.

The device as shown in these figures is constructed for use as the front axle of a vehicle, and any downward movement of the vehicle body upon the levers will compress the springs 28, and at the same time cause the wheels or rollers 16 of the thrust heads to run around the arcuate tracks or runways 3, and since the curvature of said tracks are the arcs of circles of less diameter than a circle with the pivot points of the levers as a center, the thrust heads will be forced inward against the action of the springs 17, which with the springs 28 will effectually cushion the vehicle body, limiting the movements thereof, and absorbing any shock which would otherwise be transmitted thereto.

Should the vehicle body tilt to one side the arm of one of the levers will be depressed, thus raising the foot of said lever, thus transmitting a certain amount of the shock through the springs 28 to the other lever, and in this way equalizing the weight and shock upon each of the levers and the thrust heads.

In Fig. 5 I have shown a slightly modified form of my invention constructed so that it may be used at the rear of the vehicle and in conjunction with the rear axle, the device being attached to said rear axle in any suitable and well known manner.

In this form of the invention the strut beam 2 is provided with an offset 29 adapted to pass over the differential gear casing of the vehicle, and if found desirable the parts may be strengthened by a torsion wire passing over a suitable projection from said gear casing, such as shown in Figs. 6 and 12 to be hereinafter described.

In order to adapt the levers in this form of my invention, I show the parts of said levers arranged at different angles, as illustrated in Fig. 1, but the essential parts remain the same.

In Figs. 6 to 8 inclusive I have shown the arcuate tracks or runways 3 constructed without a strut beam and secured to brackets 30 which are clamped directly upon the axle casing 31 of the vehicle, and this construction permits the levers to be mounted in the rear of the differential gear casing 32. The cover 33 of the gear casing is preferably provided with a raised portion 34, thicker than the heads of the bolts which secure said cover to the gear casing and parallel with this raised portion but spaced therefrom is a journal lug or projection 35 formed integral with the cover, and between these are mounted the levers 5 and 6 by means of the stud 7. Also formed integral with said cover 33 is an extension 36 which projects downward therefrom, and over which passes the torsion wire 34, the ends thereof being attached in any suitable manner to the arcuate track or runway members.

The levers shown in this form of my device are constructed in the same manner as shown in Fig. 1, and the vehicle body is mounted thereon the same as hereinafter described.

In Fig. 9 I have shown the arcuate tracks or runways 3 formed separately and attached to the strut beam 2 in some suitable manner as by bolts 37 and nuts 38, while the journal lugs or projections 4 are formed integral with the strut beam.

Figure 10:
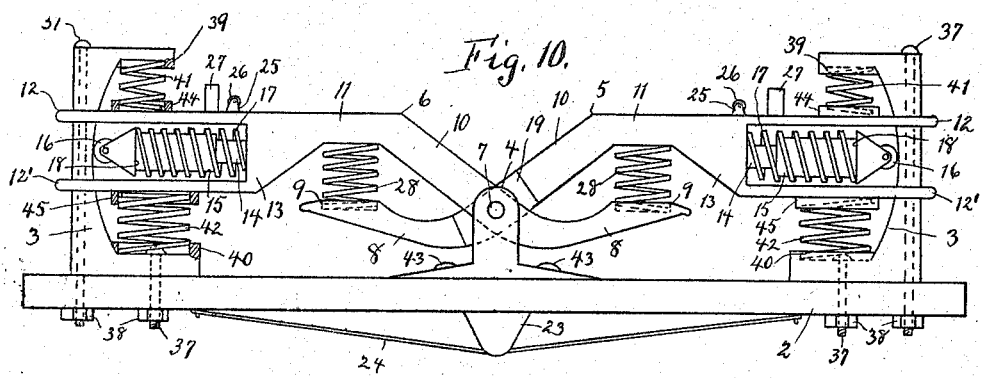
Fig. 10, is a similar view of still another form of the device.

In Fig. 10 I have shown the arcuate tracks or runways secured to the strut beam, and these tracks are provided at each end beyond the track surface with sockets 39 and 40 for the reception of one end of the springs 41 and 42 respectively. The levers 5 and 6 are pivoted between the journal lugs 4 which are formed as a single member, the same being attached to the strut beam by means of bolts 43 or their equivalent, and each of these levers is provided at its outer end with two pairs of fingers 12 and 12', said pairs of fingers being spaced apart and arranged one pair below the other, the upper pair being provided with a socket 44 for the opposite end of the spring 41, and the lower pair being provided with a socket 45 for the reception of the opposite end of the spring 42, so that besides the springs 28 and the thrust heads there are provided four additional resilient elements in the springs 41 and 42. Between the two pairs of fingers of each lever is situated the spring pressed thrust head constructed in the same manner as described in the other forms of the invention.

Figure 11:
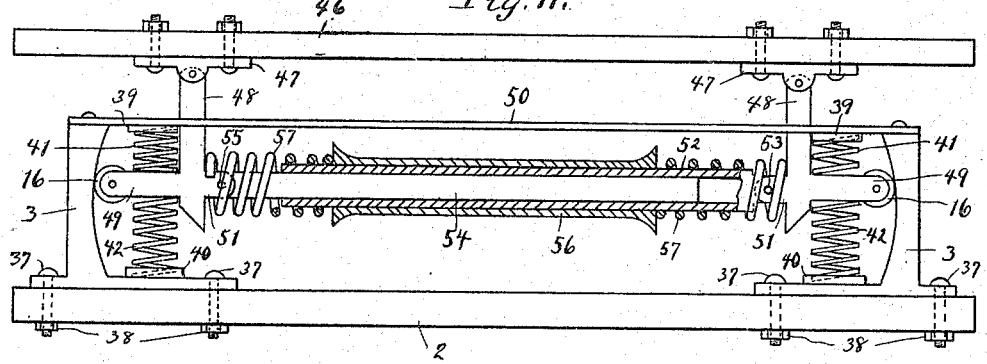
Fig. 11, is a front elevation of a slightly different construction, portions thereof being in section.

In Fig. 11 I have shown a different construction for carrying out my invention in which 46 represent a vehicle body supporting bar or the chassis having hangers 47 secured thereto in any suitable manner, and to these hangers are pivoted the swinging members 48, each having the outwardly projecting arm 49 in the ends of which are journaled the rollers 16 running upon the track surfaces of the arcuate tracks or runways 3, which are secured to the strut beam 2 in a manner similar to that hereinbefore described, and the upper ends of these arcuate tracks or runways are braced by means of reach bars 50.

Projecting inwardly from each of the swinging members 48 is a lug 51, and to one of these is pivoted the tubular member 52 as at 53. To the lug of the other member is pivoted a rod 54 as at 55, said rod telescoping in the tubular member 52. Upon the tubular member is loosely mounted the sleeve or spool 56 having enlarged ends so as to form abutments for one end of each of the springs 57, the other ends of said springs engaging the swinging members 48, thus normally forcing said swinging members outward to hold the rollers 16 in constant contact with the track surfaces of the arcuate tracks or runways 3.

In this form of my device any weight evenly distributed upon the member 46 will compress the springs 42 arranged between the bases of the track members and the arms 49 of the swinging members, and said downward movement of the swinging members will cause the rollers 16 to run upon those portions of the arcuate tracks which are the least distance apart, causing the lower ends of the swinging members to be forced inward against the action of the springs 57, so that said springs are brought into play to assist the springs 42 in cushioning and absorbing any shocks.

Should the weight upon the member 46 be distributed unevenly, and one of the swinging members 48 forced downward, the other swinging member will naturally be forced upward against the action of its springs 41, one of which is situated between the arms 49 and the reach rods 50, or if the member 46 and the strut beam 2 are moved apart, then both of the springs 41 will be brought into play.

In Figs. 12 to 15 inclusive I have shown another form of my invention which may be readily and quickly applied to old vehicles which have been using some other form of suspension device, and in this embodiment of my invention I utilize a plate or base member 58 from which projects a plurality of arcuate tracks or runways 3 and 3', preferably three in number, two of which, those numbered 3, are diametrically opposite, while the other 3' is at right angles thereto, and the upper ends of all of these tracks are connected together by an integral cross piece 59.

The base member is fastened to the vehicle axle or the casing 31, inclosing the same by means of a clamping plate 60 adapted to underlie the axle casing and secured to the base 58 by means of bolts 61 or their equivalent, and these clamping plates may if found desirable be provided with extensions 62, whereby torsion wires may be utilized for strengthening the parts. Between the two members having the tracks 3 formed therein is arranged a body supporting rod 63 having thrust heads 15 slidably mounted in the ends thereof, and normally forced outward by means of springs 17, these thrust heads carrying rollers 16 for engagement with the arcuate tracks or runways 3'. Each end of the body supporting rod 63 is provided with a pair of oppositely disposed thrust head supports 14, on which are mounted the thrust heads 15 each carrying a roller 16 for engagement with the diametrically opposite arcuate tracks 3, and these are held in engagement with the track surfaces by means of springs 17 arranged between the thrust heads and the edges of the body supporting rod 63.

In this form of the device the cover 33 of the gear casing is provided with the depending extension 36 over which passes the torsion wire 24, the ends thereof being fastened to the track members in any suitable manner. Any movement of either or both ends of the body supporting rod 63 will force all of the thrust heads inward against the action of their springs, so as to absorb any shocks, and in addition to these spring actuated thrust heads I provide a pair of springs 41 and 42 at each end of the body supporting rod 63, one engaging the underside of the rod and the other the upper side thereof, while the opposite ends of said springs engage suitable portions of the member carrying the arcuate tracks.

Of course I do not wish to be limited to the exact details of construction as herein shown, as these may be varied within the limits of the appended claims without departing from the spirit of my invention.

Having thus fully described my invention, what I claim as new and useful, is—

1. A vehicle suspension and shock absorber comprising arcuate tracks, body supporting means, and spring actuated thrust members carried by the body supporting means and engaging said arcuate tracks.

2. A vehicle suspension and shock absorber comprising supporting means connected with the running gear of a vehicle, arcuate tracks carried by said supporting means, movable body supporting means and spring pressed members carried by said means and engaging said arcuate tracks.

3. A vehicle suspension and shock absorber comprising arcuate tracks supported by the running gear of a vehicle, pivot levers coacting with said arcuate tracks and spring pressed thrust members carried by said levers and engaging said tracks.

4. A vehicle suspension and shock absorber comprising arcuate tracks supported by the running gear of a vehicle, pivot levers coacting with said arcuate tracks, spring pressed thrust members carried by said levers and engaging said tracks, and resilient means situated between one portion of one lever and a different portion of the coacting lever.

5. In a device of the character stated a strut beam, arcuate tracks carried thereby, body supporting means and spring pressed thrust members carried by the body supporting means and engaging said arcuate tracks.

6. In a device of the character stated a strut beam, arcuate tracks carried thereby, a pair of coacting levers pivoted to the strut beam, springs arranged between different parts of said levers, and spring pressed thrust means carried by said levers and engaging said arcuate tracks.

7. In a device of the character stated a strut beam, arcuate tracks carried thereby, a pair of coacting levers pivoted to the strut beam, springs arranged between different parts of said levers, thrust head supports carried by the levers, thrust heads slidably mounted thereon, rollers carried by said heads and engaging the tracks and springs for normally forcing said thrust heads outward.

In testimony whereof, I have hereunto affixed my signature.

FLETCHER O. BOSWELL.

Copies of this patent may be obtained for five cents each, by addressing the "Commissioner of Patents, Washington, D. C."